Dec. 26, 1939.  G. A. ELLESTAD  2,184,417
OPHTHALMIC MOUNTING
Filed March 27, 1937
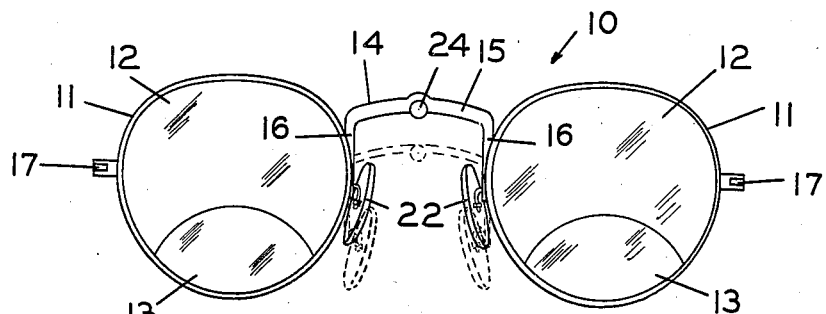
FIG. 1
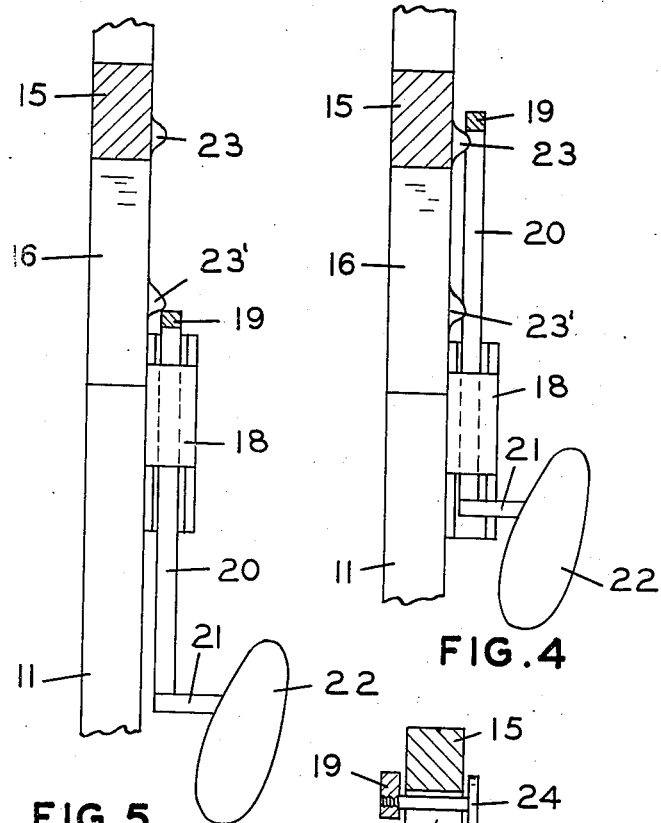
FIG. 5
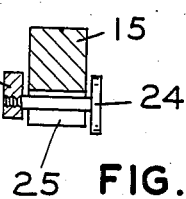
FIG. 6
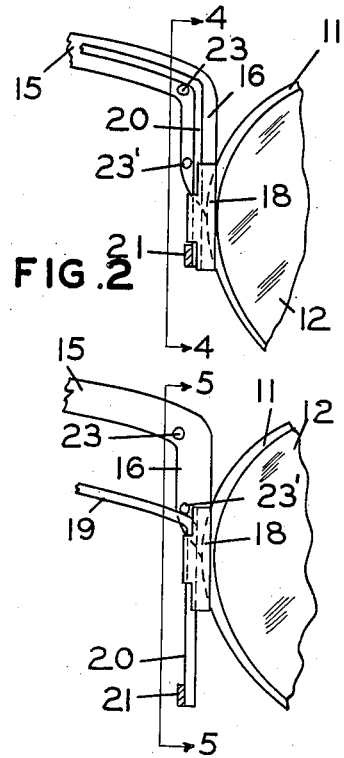
FIG. 2
FIG. 3
*Gerhard A. Ellestad*
INVENTOR.

Patented Dec. 26, 1939

2,184,417

UNITED STATES PATENT OFFICE 2,184,417

OPHTHALMIC MOUNTING

Gerhard A. Ellestad, Rochester, N. Y., assignor to Bausch & Lomb Optical Company, Rochester, N. Y., a corporation of New York Application March 27, 1937, Serial No. 133,432

4 Claims. (Cl. 88—49)

This invention relates to ophthalmic mountings and more particularly it has reference to spectacles which embody multifocal lenses having portions used for reading vision and portions used for distant vision. In such types of lenses, the reading vision portions are generally located at the lower parts of the lenses so that the upper parts are left unrestricted for distant vision. With the reading portions so positioned, it is necessary for the wearer, while reading, to tilt his head backwards and look downwardly so that the line of vision will pass through the reading portion of the lens. This is a somewhat awkward and tiring position and to overcome this disadvantage it has been proposed to provide spectacles having nose engaging portions which can be vertically adjusted with respect to the lenses so as to selectively position either the distant or near vision portion of the lens directly in front of the eye. Such proposed types of mountings and frames have been relatively complicated in structure and unsightly in appearance.

One of the objects of my invention is to provide an improved ophthalmic mounting which will be relatively simple in structure and embody means for adjustably positioning the nose engaging elements with respect to the lenses. A further object is to provide an ophthalmic mounting of the type described which will be efficient in operation and neat in appearance. Another object is to provide simple and improved means for limiting the vertical movement of the nose engaging elements in a mounting of the type described. Still another object is to provide, for such a mounting, improved finger engaging means for moving the nose engaging elements relative to the lenses. These and other objects and advantages reside in certain novel features of construction, arrangement and combination of parts as will hereinafter be more fully described and pointed out in the appended claims.

Referring to the drawing:

Fig. 1 is a front view of a pair of spectacles embodying my invention.

Fig. 2 is a fragmentary rear view showing a portion of the mounting as it appears when the nose pads are in full line position of Fig. 1.

Fig. 3 is a similar view showing the relation of parts when the nose pads are in the lower position shown in dotted line in Fig. 1.

Fig. 4 is an enlarged view taken on line 4—4 of Fig. 2.

Fig. 5 is an enlarged view taken on line 5—5 of Fig. 3.

Fig. 6 is a sectional view showing a detail.

A preferred embodiment of my invention is shown in the drawing wherein 10 indicates, generally, a pair of spectacles comprising the two lens holding devices or eyewires 11 carrying lenses 12 having reading portions 13. The two eyewires 11 are connected by a bridge 14 having an arch 15 and two spaced sides 16 soldered, respectively, to the nasal sides of the eyewires 11. Each eyewire 11 also carries an endpiece 17 to pivotally receive the usual temples, not shown.

A tubular guide member 18 is mounted on the rear face of the nasal edge of each eyewire 11 and may also have a soldered connection with the rear face of the side 16. An auxiliary bridge having the arch portion 19 and the two spaced legs 20 is mounted for vertical movement on the rear of the spectacle frame with each leg 20 slidably mounted in a guide member 18. The legs 20 engage the guide members 18 very loosely so that the frictional engagement between the legs and guide members is not sufficient to hold the auxiliary bridge in any selected vertical position. Secured to each leg 20 is a rearwardly extending arm 21 carrying a nose engaging pad or element 22. Projecting rearwardly from the rear face of the bridge side 16 are the two vertically spaced projectors 23 and 23', which are positioned in the path of the arch 19 of the auxiliary bridge and adapted to act as stops for limiting the upward and downward movements of the auxiliary bridge. To facilitate movement of the auxiliary bridge, a forwardly extending, centrally disposed pin 24 is mounted on the arch 19 of the auxiliary bridge. When the auxiliary bridge is in the upper position, the arch 19 is concealed behind arch 15 and the pin 24 is disposed within a centrally disposed slot 25 in the lower edge of arch 15, as shown in Fig. 6.

In operation, the spectacles with the auxiliary bridge in the upper or full line position of Fig. 1 are adapted for the use of the upper or distant vision portions of the lens. It will be apparent, that from the observer's side, the spectacles will appear practically like an ordinary pair of glasses as the small head on operating pin 24 can be engraved or ornamented so as to blend in with the front surface of the bridge 14. In this position the parts appear, as shown in Figs. 2 and 4, with the lower edge of arch 19 engaging or resting on the upper side of the upper projection 23. Hence, even though the legs 20 are loosely positioned in guide members 18, the auxiliary bridge will rest upon the upper projection 23 and so be prevented from moving downward under its own weight.

When the wearer desires to use the reading or near vision portions 13 of the lenses, one hand holds the spectacle frame and a finger of the other hand grasps the head of pin 24 and moves the auxiliary bridge downwardly. During this movement, the arch 19 yields enough to ride over the upper projection 23 and then yields again as it rides over the lower projection 23' and snaps into position with the upper edge of arch 19 engaging the under side of the lower projection 23'. It will be understood, of course, that when the auxiliary bridge is in the "down" position, shown in dotted line in Fig. 1, the reading segments 13 will be positioned directly in front of the eyes.

From the foregoing it will be apparent that I am able to attain the objects of my invention and provide an improved ophthalmic mounting having means for selectively positioning the nose engaging pads vertically with respect to the lenses. The limiting stop projections 23 and 23' may be placed on one or both sides 16 of the bridge 14. When the glasses are used for distant vision, the weight of the glasses may be sufficient to keep the auxiliary bridge in the "up" position and so it may be possible to eliminate the upper projection 23, though the two projections would preferably be used. Although I have shown my invention as applied to a frame having eyewires surrounding the lenses, it can be applied, equally well, to the center and bridge of a so-called rimless mounting. Various modifications can obviously be made without departing from the spirit of my invention as pointed out in the appended claims.

I claim:

1. An ophthalmic mounting comprising a pair of lens holding devices carrying lenses, a bridge connecting said devices, a guide member mounted adjacent to each device, an auxiliary bridge having an arch and two spaced legs, said legs being mounted, respectively, on said members and loosely slidable thereupon, a nose pad carried by each leg, and stop means for holding said auxiliary bridge in adjusted position, said means comprising a projection positioned on the rear face of said bridge in the path of said arch and having a cam surface, said arch being constructed and arranged to yield resiliently and slide over said cam surface so that said arch is held in position by resting against the projection.

2. An ophthalmic mounting comprising a pair of lens holding devices carrying lenses, a bridge connecting said devices, a guide member mounted on each device adjacent the rear face of said bridge, an auxiliary bridge having two legs and an arch portion, said legs being slidably mounted for loose movement on said guide members, each of said legs carrying a nose engaging element, and stop means for holding said auxiliary bridge in adjusted position, said means including a pair of spaced projections extending rearwardly from the rear face of said bridge and in the path of said arch portion and having cam surfaces, said arch portion being resilient and constructed and arranged to yield and move over the cam surfaces of the projections and into a position where the edge of the portion engages a side of a projection and holds the auxiliary bridge in adjusted position.

3. An ophthalmic mounting comprising a pair of lens holding devices, a bridge having spaced sides secured, respectively, to said devices, a guide member adjacent the rear face of each side, an auxiliary bridge having two spaced legs and an arch portion, said legs being mounted, respectively, on said guide members, for loose sliding engagement therewith, a nose pad carried by each leg, and means for limiting the vertical movement of said auxiliary bridge, said means including two vertically spaced projections extending rearwardly from the rear face of one of said sides, said projections being positioned in the path of said arch portion and each having a cam surface, said arch portion being constructed and arranged to yield resiliently and ride over the cam surfaces and assume a position in which either the upper edge of the arch portion engages the lower side of the lower projection or the lower edge of the arch portion engages the upper side of the upper projection.

4. An ophthalmic mounting comprising a pair of lens holding devices carrying lenses, a bridge connecting said devices, a guide member mounted adjacent to each device, an auxiliary bridge having an arch and two spaced legs, said legs being mounted, respectively, on said guide members and loosely slidable thereon, a nose pad carried by each leg, and stop means for holding said auxiliary bridge in adjusted position, said means comprising a part extending rearwardly from said bridge and in the path of a part of said auxiliary bridge, and a cam surface on one of said parts, the other part being constructed and arranged to yield resiliently and ride over said cam surface.

GERHARD A. ELLESTAD.